(12) United States Patent
Shen

(10) Patent No.: US 12,185,227 B2
(45) Date of Patent: Dec. 31, 2024

(54) METHOD FOR DETERMINING EFFECTIVE TIME OF MINIMUM CROSS-SLOT SCHEDULING INTERVAL AND ELECTRONIC DEVICE

(71) Applicant: VIVO MOBILE COMMUNICATION CO., LTD., Guangdong (CN)

(72) Inventor: Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 325 days.

(21) Appl. No.: 17/576,520

(22) Filed: Jan. 14, 2022

(65) Prior Publication Data

US 2022/0150947 A1    May 12, 2022

Related U.S. Application Data

(63) Continuation of application No. PCT/CN2020/100001, filed on Jul. 2, 2020.

(30) Foreign Application Priority Data

Jul. 17, 2019   (CN) .......................... 201910647601.4

(51) Int. Cl.
*H04W 48/16* (2009.01)
*H04L 5/00* (2006.01)
*H04W 72/23* (2023.01)

(52) U.S. Cl.
CPC ............. *H04W 48/16* (2013.01); *H04L 5/001* (2013.01); *H04W 72/23* (2023.01)

(58) Field of Classification Search
CPC ..... H04W 72/23–232; H04W 72/0446; H04W 72/0453; H04W 48/00; H04W 48/16; H04L 5/001

See application file for complete search history.

(56) References Cited

U.S. PATENT DOCUMENTS

| | | | |
|---|---|---|---|
| 2020/0053755 A1* | 2/2020 | Ang | H04W 72/0446 |
| 2020/0186302 A1* | 6/2020 | Manolakos | H04L 5/0051 |
| 2022/0053553 A1* | 2/2022 | Li | H04W 72/1263 |
| 2022/0232611 A1* | 7/2022 | Hakola | H04W 52/0229 |

FOREIGN PATENT DOCUMENTS

| | | |
|---|---|---|
| WO | 2018/106043 A1 | 6/2018 |
| WO | 2018/175420 A1 | 9/2018 |

OTHER PUBLICATIONS

Procedure of cross-slot scheduling for UE power saving, 3GPP TSG RAN WG1 #97, May 13-17, 2019, R1-1906006, Huawei, HiSilicon, Reno, USA.

(Continued)

*Primary Examiner* — Kevin C. Harper
(74) *Attorney, Agent, or Firm* — IP & T GROUP LLP

(57) ABSTRACT

A method for determining an effective time of a minimum cross-slot scheduling interval includes: receiving a second minimum cross-slot scheduling interval; and making the second minimum cross-slot scheduling interval take effect at or after an effective time. The effective time depends on following parameter: a position of a symbol where a first channel is located.

20 Claims, 4 Drawing Sheets

(56) References Cited

OTHER PUBLICATIONS

Summary of Cross-slot Scheduling Power-Saving Techniques, 3GPP TSG RAN WG1 Meeting #97, May 13-17, 2019, R1-190XXXX, MediaTek Inc., Reno, NV, USA.
Views on UE power saving, 3GPP TSG RAN WG1 Meeting #94, Aug. 20-24, 2018, p. 1-11, R1-1809462, Qualcomm Incorporated, Gothenburg, Sweden.
International Search Report and Written Opinion of Priority Application No. PCT/CN2020/100001 issued by the Chinese Patent Office on Oct. 10, 2020.

* cited by examiner

METHOD FOR DETERMINING EFFECTIVE TIME OF MINIMUM CROSS-SLOT SCHEDULING INTERVAL AND ELECTRONIC DEVICE

CROSS-REFERENCE TO RELATED APPLICATIONS

This application is a Bypass Continuation Application of PCT/CN2020/100001, filed on Jul. 2, 2020, which claims priority to Chinese Patent Application No. 201910647601.4, filed on Jul. 17, 2019, which are incorporated herein by reference in their entirety.

TECHNICAL FIELD

The present disclosure relates to the field of communications, and in particular, to a method for determining an effective time of a minimum cross-slot scheduling interval and an electronic device.

BACKGROUND

In a case of cross-slot scheduling, a network device may notify user equipment of a cross-slot scheduling interval K through radio resource control (RRC) or by using downlink control information (DCI).

SUMMARY

Embodiments of the present disclosure provide a method for determining an effective time of a minimum cross-slot scheduling interval and an electronic device.

According to a first aspect, a method for determining an effective time of a minimum cross-slot scheduling interval is provided, applied to user equipment and including: receiving a second minimum cross-slot scheduling interval; and making the second minimum cross-slot scheduling interval take effect at or after an effective time, where the effective time depends on following parameter: a position of a symbol where a first channel is located.

According to a second aspect, a method for determining an effective time of a minimum cross-slot scheduling interval is provided, applied to a network device and including: determining an effective time, where a second minimum cross-slot scheduling interval is made take effect on user equipment at or after the effective time, and the effective time depends on following parameter: a position of a symbol where a first channel is located; and sending the second minimum cross-slot scheduling interval.

According to a third aspect, a mobile terminal is provided, including: a receiving module, configured to receive a second minimum cross-slot scheduling interval; and an effect taking module, configured to make the second minimum cross-slot scheduling interval take effect at or after an effective time, where the effective time depends on the following parameter: a position of a symbol where a first channel is located.

According to a fourth aspect, a network device is provided, including: a determining module, configured to determine an effective time, where a second minimum cross-slot scheduling interval is made take effect on user equipment at or after the effective time, where the effective time depends on the following parameter: a position of a symbol where a first channel is located; and a sending module, configured to send the second minimum cross-slot scheduling interval.

According to a fifth aspect, a mobile terminal is provided, where the mobile terminal includes a processor, a memory, and a computer program that is stored in the memory and executable on the processor, and when the computer program is executed by the processor, the steps of the method according to the first aspect are implemented.

According to a sixth aspect, a network device is provided, including: a memory, a processor, and a computer program that is stored in the memory and executable on the processor, and when the computer program is executed by the processor, the steps of the method according to the second aspect are implemented.

According to a seventh aspect, a non-transitory computer-readable storage medium is provided, where the non-transitory computer-readable storage medium stores a computer program, and when the computer program is executed by a processor, the steps of the method according to the first aspect or the second aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DESCRIPTION OF EMBODIMENTS

Figure 1:
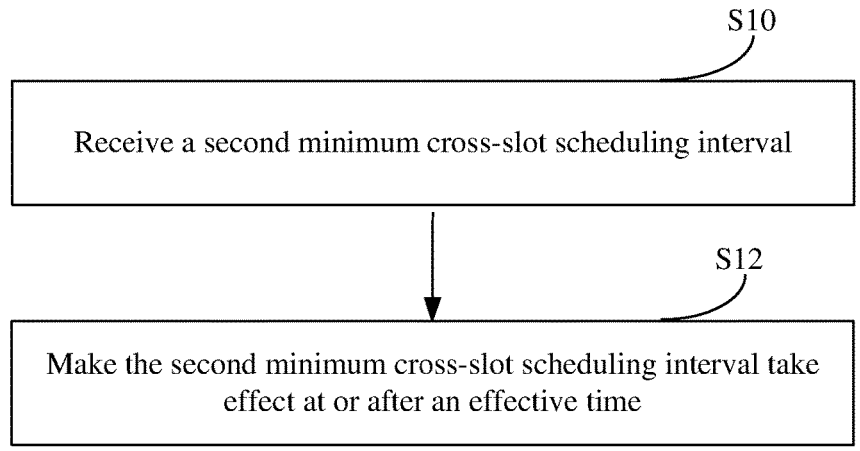
FIG. 1 is a schematic flowchart of a method for determining an effective time of a minimum cross-slot scheduling interval according to an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as a global system for mobile communications (GSM), a code division multiple access (CDMA) system, a wideband code division multiple access (WCDMA) system, a general packet radio service (GPRS) system, a long term evolution (LTE)/long term evolution-advanced (LTE-A) system, a new radio (NR) system, and the like.

A user equipment (UE), also referred to as a mobile terminal, a mobile user device, or the like, may communicate with one or more core networks through a radio access network (RAN). User equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

The base station may be a base transceiver station (BTS) in GSM or CDMA, a NodeB in WCDMA, an evolved NodeB (eNB or e-NodeB) in LTE, or a 5G gNodeB (gNB), which is not limited in the embodiments of the present disclosure. However, for ease of description, the following embodiments use gNB as an example for description.

General, a cross-slot scheduling interval K is learned by decoding of a control channel. Before the decoding of the control channel is completed, the user equipment cannot learn a value of K. Therefore, this requires a receiving function to be always enabled on the user equipment before the decoding is completed, resulting in increased power consumption of the user equipment.

In view of this, the network device needs to configure a minimum cross-slot scheduling interval k in advance and notifies the user equipment of the minimum cross-slot scheduling interval, so that the user equipment can learn a minimum value of K in advance before the decoding is completed. In this way, the receiving function does not need to be enabled in advance when decoding is performed.

Based on this, when a value of k changes, the network device may send a new value of k to the user equipment by using control signaling, and record a time at which the new value of k is sent as an effective time thereof. However, after receiving the control signaling, the user equipment needs to decode the control signaling to obtain the new value of k. Therefore, the new value of k cannot take effect immediately, which results in an inconsistency between the effective time recorded by the network device and an actual effective time of the new value of k on the user equipment. As a result, the user equipment cannot effectively implement cross-slot scheduling.

The following describes in detail the technical solutions provided in the embodiments of the present disclosure with reference to the accompanying drawings.

FIG. 1 is a schematic flowchart of a method for determining an effective time of a minimum cross-slot scheduling interval according to an embodiment of the present disclosure, where the method may be performed by an electronic device, for example, a user equipment. In other words, the method may be performed by software or hardware installed on the user equipment. As shown in this figure, the method may include the following steps.

Step S10: Receive a second minimum cross-slot scheduling interval.

In a case of cross-slot scheduling, a network device may notify the user equipment of a first minimum cross-slot scheduling interval k, and when a value of k changes, notify the user equipment of a new value of k, namely a second minimum cross-slot scheduling interval k'. In this step, the user equipment receives the second minimum cross-slot scheduling interval k', where k' is greater than or equal to 0.

Step S12: Make the second minimum cross-slot scheduling interval take effect at or after an effective time.

Figure 2A:
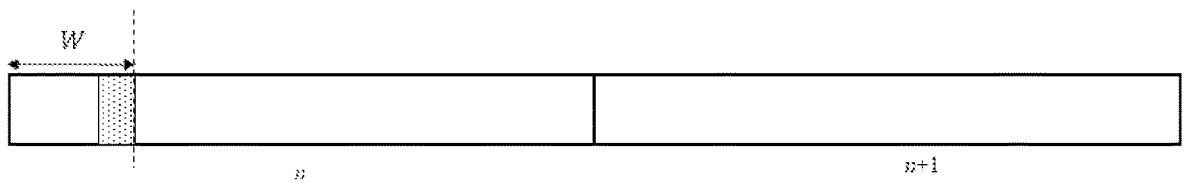
FIG. 2A is a schematic diagram of an effective time according to an embodiment of the present disclosure.

FIG. 2A is a schematic diagram of an effective time according to an embodiment of the present disclosure. As shown in this figure, the effective time depends on a location W of a symbol where a first channel is located.

In an implementation, the effective time is at or after the location W of the symbol where the first channel is located, and the second minimum cross-slot scheduling interval k' received in the previous step is made take effect on the user equipment at or after the effective time.

In another implementation, the effective time is a value obtained by performing rounding on the location W of the symbol where the first channel is located, and the second minimum cross-slot scheduling interval k' received in the previous step is made take effect on the user equipment at or after the effective time.

Through application of the method for determining an effective time of a minimum cross-slot scheduling interval provided in this embodiment of the present disclosure to user equipment, a second minimum cross-slot scheduling interval is received; and the second minimum cross-slot scheduling interval is made take effect at or after an effective time, where the effective time depends on the following parameter: a position of a symbol where a first channel is located, which can help properly determine an effective time of a changed value of k, so that an effective time recorded by a network device is consistent with an actual effective time of a changed minimum cross-slot scheduling interval on the user equipment. Therefore, a terminal can effectively implement cross-slot scheduling and terminal energy saving.

Figure 2B:
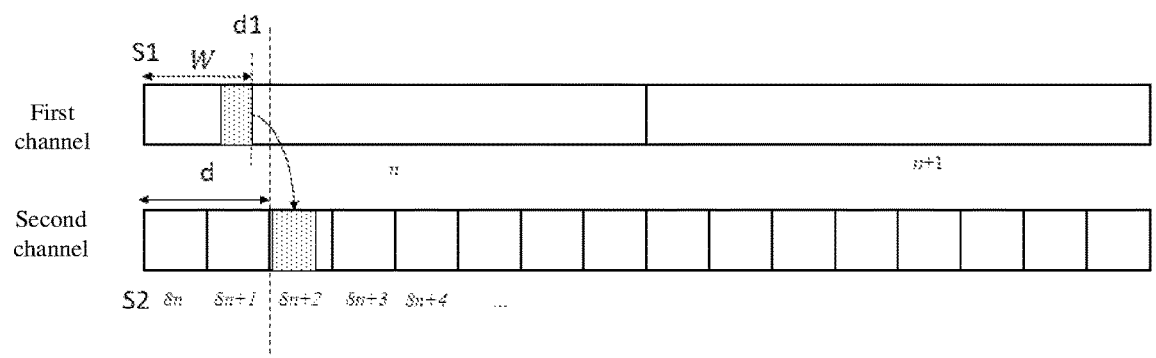
FIG. 2B is second schematic diagram of an effective time according to an embodiment of the present disclosure.

FIG. 2B is a schematic diagram of an effective time according to another embodiment of the present disclosure. As shown in this figure, the effective time depends on a location W of a symbol where a first channel is located, a slot number n, a subcarrier spacing (SCS) of a scheduled carrier, and an SCS of a scheduling carrier.

In a case of cross-carrier scheduling, the slot number n needs to be obtained through conversion based on the SCS of the scheduled carrier and the SCS of the scheduling carrier. For example, a slot location S2, namely a second slot start position S2, that is of a scheduled carrier where a second channel is located and that corresponds to a first slot start position S1 of a scheduling carrier where the first channel is located may be determined based on the slot number n, the SCS of the scheduled carrier, and the SCS of the scheduling carrier.

In an implementation, when the slot location S2 that is of the scheduled carrier where the second channel is located is obtained through conversion based on the first slot start position S1 of the scheduling carrier where the first channel is located;

the second slot start position S2 may be:

$$\left\lfloor n \cdot \frac{2^{\mu_S}}{2^{\mu_C}} \right\rfloor,$$

where $\mu_C$ and $\mu_S$ respectively denote configuration numbers corresponding to SCSs of the first channel and the second channel, as listed in Table 1.

TABLE 1

| μ | Δf = $2^μ$ · 15 [kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, a first slot interval d is a quantity of slots between a location d1 of a last symbol of the first channel and the second slot start position S2.

In an implementation, the first slot interval d between the location d1 of the last symbol of the first channel and the second slot start position S2 is:

$$\left\lfloor W \cdot \frac{2^{\mu_S}}{2^{\mu_C}} \Big/ N_{symb}^{slot} \right\rfloor \text{ or } \left\lceil W \cdot \frac{2^{\mu_S}}{2^{\mu_C}} \Big/ N_{symb}^{slot} \right\rceil,$$

where

W denotes an index of the last symbol of the first channel in an entire slot. Indexes may be numbered starting from 1, that is, a first symbol is numbered as 1. Certainly, in this method, the first symbol may alternatively be numbered starting from another integer, such as 0, 2, or 3·$\mu_C$ and $\mu_S$ respectively denote configuration numbers (with reference to Table 1) corresponding to SCSs of the first channel and the second channel, and $N_{symb}^{slot}$ denotes a quantity of consecutive symbols in a slot of a scheduling carrier.

In this implementation, the effective time is a sum value obtained by adding up the second slot start position S2 and the first slot interval d and then performing rounding on an obtained result or by performing rounding on the second slot start position S2 and the first slot interval d and then adding up obtained results.

In an implementation, the effective time is:

$$n' = \left\lfloor n \cdot \frac{2^{\mu_S}}{2^{\mu_C}} \right\rfloor + \left\lfloor W \cdot \frac{2^{\mu_S}}{2^{\mu_C}} \Big/ N_{symb}^{slot} \right\rfloor; \text{ or}$$

$$n' = \left\lfloor n \cdot \frac{2^{\mu_S}}{2^{\mu_C}} \right\rfloor + \left\lceil W \cdot \frac{2^{\mu_S}}{2^{\mu_C}} \Big/ N_{symb}^{slot} \right\rceil; \text{ or}$$

$$n' = \left\lfloor n \cdot \frac{2^{\mu_S}}{2^{\mu_C}} + W \cdot \frac{2^{\mu_S}}{2^{\mu_C}} \Big/ N_{symb}^{slot} \right\rfloor,$$

where through application of the method for determining an effective time of a minimum cross-slot scheduling interval provided in this embodiment of the present disclosure to user equipment, a second minimum cross-slot scheduling interval is received; and the second minimum cross-slot scheduling interval is made take effect at or after an effective time, where the effective time depends on the following parameters: a location W of a symbol where a first channel is located, a slot number n, an SCS of a scheduled carrier, and an SCS of a scheduling carrier, which can help properly determine an effective time of a changed value of k in a case of cross-carrier scheduling, so that an effective time recorded by a network device is consistent with an actual effective time of a changed minimum cross-slot scheduling interval on the user equipment. Therefore, a terminal can effectively implement cross-slot scheduling and terminal energy saving.

Figure 2C:
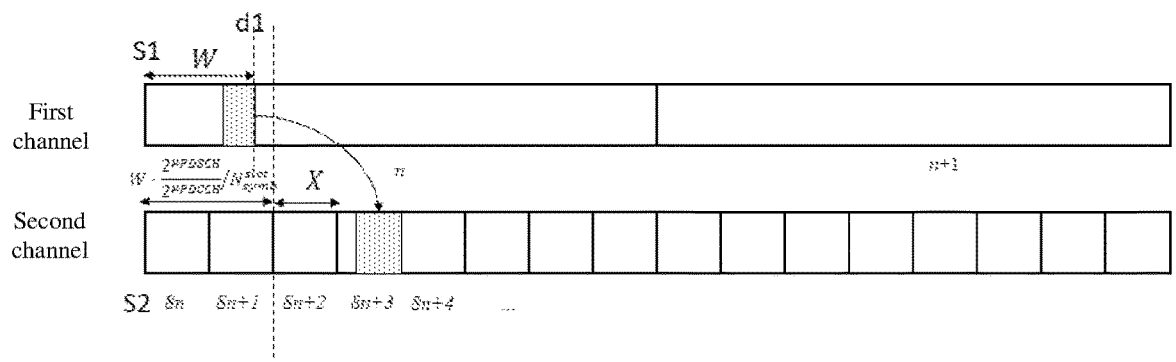
FIG. 2C is third schematic diagram of an effective time according to an embodiment of the present disclosure.

FIG. 2C is a schematic diagram of an effective time according to still another embodiment of the present disclosure. As shown in this figure, the effective time depends on a location W of a symbol where a first channel is located, a slot number n, an SCS of a scheduled carrier, an SCS of a scheduling carrier, and a third minimum cross-slot scheduling interval X of the scheduled carrier.

In an implementation, the effective time is a sum of a sum value and the third minimum cross-slot scheduling interval X of the scheduled carrier, where the sum value is obtained by adding up a second slot start position S2 and a first slot interval d and then performing rounding on an obtained result or by performing rounding on the second slot start position S2 and the first slot interval d and then adding up obtained results.

Conversion of the second slot start position S2 and the first slot interval d is the same as that in the previous implementation, and details are not described herein again.

In this implementation, the effective time is:

$$n' = \left\lfloor n \cdot \frac{2^{\mu_S}}{2^{\mu_C}} \right\rfloor + \left\lfloor W \cdot \frac{2^{\mu_S}}{2^{\mu_C}} \Big/ N_{symb}^{slot} \right\rfloor + X; \text{ or}$$

$$n' = \left\lfloor n \cdot \frac{2^{\mu_S}}{2^{\mu_C}} \right\rfloor + \left\lceil W \cdot \frac{2^{\mu_S}}{2^{\mu_C}} \Big/ N_{symb}^{slot} \right\rceil + X; \text{ or}$$

$$n' = \left\lfloor n \cdot \frac{2^{\mu_S}}{2^{\mu_C}} + W \cdot \frac{2^{\mu_S}}{2^{\mu_C}} \Big/ N_{symb}^{slot} \right\rfloor + X,$$

where n' denotes a slot number corresponding to the effective time, W denotes an index of a last symbol of the first channel in an entire slot, $\mu_C$ and $\mu_S$ respectively denote configuration numbers corresponding to SCSs of the first channel and the second channel, $N_{symb}^{slot}$ denotes a quantity of consecutive symbols in a slot of a scheduling carrier, and X denotes the third minimum cross-slot scheduling interval of the scheduled carrier and may be a fixed value or a predefined value.

In another implementation, the third minimum cross-slot scheduling interval X of the scheduled carrier depends on a first minimum cross-slot scheduling interval k received before the second minimum cross-slot scheduling interval k' is received, and the first minimum cross-slot scheduling interval k is greater than or equal to 0. In other words, the effective time depends on the following parameters: the position of the symbol where the first channel is located, the slot number n, the SCS of the scheduled carrier, the SCS of the scheduling carrier, and the first minimum cross-slot scheduling interval k.

In an implementation, the third minimum cross-slot scheduling interval X of the scheduled carrier is a larger one between the first minimum cross-slot scheduling interval k and a minimum feasible non-zero application delay Z of the SCS of the scheduled carrier, that is, X=max(Y, Z), where Y is the first minimum cross-slot scheduling interval k. In an implementation, Z may be 1, or may be a predefined number related to a subcarrier spacing. For example, Z is 1 when the subcarrier spacing is 15 kHz, 30 kHz, or 60 kHz, or is 2 when the subcarrier spacing is 120 kHz.

In an implementation, the first channel may include a physical downlink control channel (PDCCH), and the second channel may include a physical downlink shared channel (PDSCH) or a physical uplink shared channel (PUSCH).

In a case of cross-carrier scheduling, K may include K0 and K2. K0 denotes a cross-slot scheduling interval at which the PDSCH is scheduled by using the PDCCH, and K2 denotes a cross-slot scheduling interval at which the PUSCH is scheduled by using the PDCCH. Similarly, k/k' may also include k0/k0' and k2/k2', where k0 or k0' denotes a minimum cross-slot scheduling interval at which the PDSCH is scheduled by using the PDCCH, and k2 or k2' denotes a minimum cross-slot scheduling interval at which the PUSCH is scheduled by using the PDCCH. A method for determining an effective time of k0 or k0' and k2 or k2' is the same as that shown in FIG. 2A to FIG. 2C, and details are not described herein again.

Through application of the method for determining an effective time of a minimum cross-slot scheduling interval provided in this embodiment of the present disclosure to user equipment, a second minimum cross-slot scheduling interval is received; and the second minimum cross-slot scheduling interval is made take effect at or after an effective time, where the effective time depends on the following parameters: a location W of a symbol where a first channel is located, a slot number n, an SCS of a scheduled carrier, an SCS of a scheduling carrier, and a third minimum cross-slot scheduling interval X of the scheduled carrier, which can help determine an effective time of a changed value of k more properly in a case of cross-carrier scheduling, so that an effective time recorded by a network device is consistent with an actual effective time of a changed minimum cross-slot scheduling interval on the user equipment. Therefore, a terminal can effectively implement cross-slot scheduling and terminal energy saving.

Figure 3:
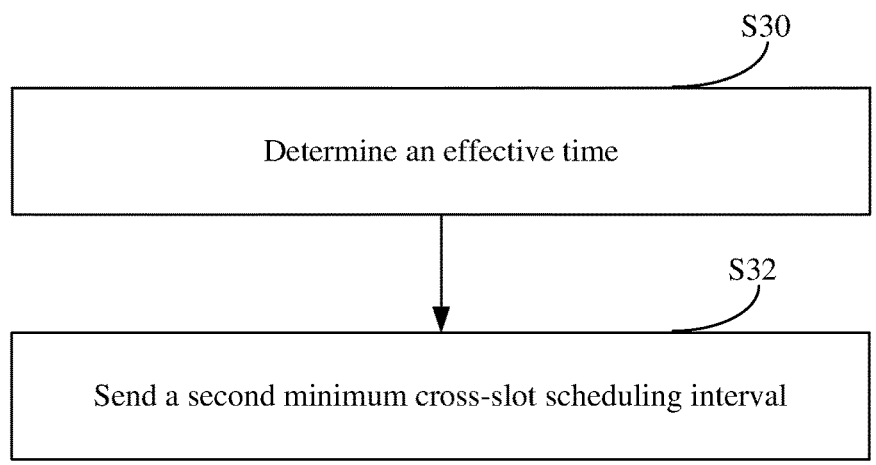
FIG. 3 is another schematic flowchart of a method for determining an effective time of a minimum cross-slot scheduling interval according to an embodiment of the present disclosure.

FIG. 3 is a another schematic flowchart of a method for determining an effective time of a minimum cross-slot scheduling interval according to an embodiment of the present disclosure, where the method may be performed by an electronic device, for example, a network device. In other words, the method may be performed by software or hardware installed on the network device. As shown in this figure, the method may include the following steps.

Step S30: Determine an effective time.

In a case of cross-slot scheduling, the network device may notify user equipment of a first minimum cross-slot scheduling interval k and determine an effective time when a value of k changes; and a changed value of k, namely a second minimum cross-slot scheduling interval k', takes effect on the user equipment at or after the effective time, where the effective time depends on the following parameter: a position of a symbol where a first channel is located.

Step S32: Send the second minimum cross-slot scheduling interval.

When a value of k changes, the network device sends a changed value of k, namely the second minimum cross-slot scheduling interval k', to the user equipment.

With reference to FIG. 2A, the effective time depends on a location W of a symbol where a first channel is located.

In an implementation, the effective time is at or after the location W of the symbol where the first channel is located, and the second minimum cross-slot scheduling interval k' received in the previous step is made take effect on the user equipment at or after the effective time.

In another implementation, the effective time is a value obtained by performing rounding on the location W of the symbol where the first channel is located, and the second minimum cross-slot scheduling interval k' received in the previous step is made take effect on the user equipment at or after the effective time.

Through application the method for determining an effective time of a minimum cross-slot scheduling interval provided in this embodiment of the present disclosure to a network device, an effective time is determined and a second minimum cross-slot scheduling interval is made take effect on user equipment at or after the effective time, where the effective time depends on the following parameter: a position of a symbol where a first channel is located; and the second minimum cross-slot scheduling interval is sent, which can help properly determine an effective time of a changed value of k, so that an effective time recorded by the network device is consistent with an actual effective time of a changed minimum cross-slot scheduling interval on the user equipment. Therefore, a terminal can effectively implement cross-slot scheduling and terminal energy saving.

With reference to FIG. 2B, in an implementation, the effective time depends on the location W of the symbol where the first channel is located, a slot number n, a subcarrier spacing (SCS) of a scheduled carrier, and an SCS of a scheduling carrier.

In a case of cross-carrier scheduling, the slot number n needs to be obtained through conversion based on the SCS of the scheduled carrier and the SCS of the scheduling carrier. For example, a slot location S2, namely a second slot start position S2, that is of a scheduled carrier where a second channel is located and that corresponds to a first slot start position S1 of a scheduling carrier where the first channel is located may be determined based on the slot number n, the SCS of the scheduled carrier, and the SCS of the scheduling carrier.

In an implementation, when the slot location S2 that is of the scheduled carrier where the second channel is located is obtained through conversion based on the first slot start position S1 of the scheduling carrier where the first channel is located, the second slot start position S2 may be:

$$\left\lfloor n \cdot \frac{2^{\mu_S}}{2^{\mu_C}} \right\rfloor,$$

where $\mu_C$ and $\mu_S$ respectively denote configuration numbers corresponding to SCSs of the first channel and the second channel, as listed in Table 1.

TABLE 1

| μ | Δf = $2^\mu$ · 15 [kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, a first slot interval d is a quantity of slots between a location d1 of a last symbol of the first channel and the second slot start position S2.

In an implementation, the first slot interval d between the location d1 of the last symbol of the first channel and the second slot start position S2 is:

$$\left\lfloor W \cdot \frac{2^{\mu_S}}{2^{\mu_C}} \middle/ N_{symb}^{slot} \right\rfloor \text{ or } \left\lceil W \cdot \frac{2^{\mu_S}}{2^{\mu_C}} \middle/ N_{symb}^{slot} \right\rceil,$$

where

W denotes an index of the last symbol of the first channel in an entire slot, $\mu_C$ and $\mu_S$ respectively denote configuration numbers (with reference to Table 1) corresponding to SCSs of the first channel and the second channel, and $N_{symb}^{slot}$ denotes a quantity of consecutive symbols in a slot of a scheduling carrier.

In this implementation, the effective time is a sum value obtained by adding up the second slot start position S2 and the first slot interval d and then performing rounding on an obtained result or by performing rounding on the second slot start position S2 and the first slot interval d and then adding up obtained results.

In an implementation, the effective time is:

$$n' = \left\lfloor n \cdot \frac{2^{\mu_S}}{2^{\mu_C}} \right\rfloor + \left\lceil W \cdot \frac{2^{\mu_S}}{2^{\mu_C}} \middle/ N_{symb}^{slot} \right\rceil; \text{ or}$$

$$n' = \left\lfloor n \cdot \frac{2^{\mu_S}}{2^{\mu_C}} \right\rfloor + \left\lfloor W \cdot \frac{2^{\mu_S}}{2^{\mu_C}} \middle/ N_{symb}^{slot} \right\rfloor; \text{ or}$$

$$n' = \left\lfloor n \cdot \frac{2^{\mu_S}}{2^{\mu_C}} + W \cdot \frac{2^{\mu_S}}{2^{\mu_C}} \middle/ N_{symb}^{slot} \right\rfloor,$$

where through application of the method for determining an effective time of a minimum cross-slot scheduling interval provided in this embodiment of the present disclosure to a network device, an effective time is determined and a second minimum cross-slot scheduling interval is made take effect on user equipment at or after the effective time, where the effective time depends on the following parameters: a location W of a symbol where a first channel is located, a slot number n, an SCS of a scheduled carrier, and an SCS of a scheduling carrier, which can help properly determine an effective time of a changed value of k in a case of cross-carrier scheduling, so that an effective time recorded by the network device is consistent with an actual effective time of a changed minimum cross-slot scheduling interval on the user equipment. Therefore, a terminal can effectively implement cross-slot scheduling and terminal energy saving.

With reference to FIG. 2C, the effective time depends on a location W of a symbol where a first channel is located, a slot number n, an SCS of a scheduled carrier, an SCS of a scheduling carrier, and a third minimum cross-slot scheduling interval X of the scheduled carrier.

In an implementation, the effective time is a sum of a sum value and the third minimum cross-slot scheduling interval X of the scheduled carrier, where the sum value is obtained by adding up a second slot start position S2 and a first slot interval d and then performing rounding on an obtained result or by performing rounding on the second slot start position S2 and the first slot interval d and then adding up obtained results.

Conversion steps of the second slot start position S2 and the first slot interval d are the same as those in the previous implementation, and details are not described herein again.

In this implementation, the effective time is:

$$n' = \left\lfloor n \cdot \frac{2^{\mu_S}}{2^{\mu_C}} \right\rfloor + \left\lceil W \cdot \frac{2^{\mu_S}}{2^{\mu_C}} \middle/ N_{symb}^{slot} \right\rceil + X; \text{ or}$$

$$n' = \left\lfloor n \cdot \frac{2^{\mu_S}}{2^{\mu_C}} \right\rfloor + \left\lfloor W \cdot \frac{2^{\mu_S}}{2^{\mu_C}} \middle/ N_{symb}^{slot} \right\rfloor + X; \text{ or}$$

$$n' = \left\lfloor n \cdot \frac{2^{\mu_S}}{2^{\mu_C}} + W \cdot \frac{2^{\mu_S}}{2^{\mu_C}} \middle/ N_{symb}^{slot} \right\rfloor + X,$$

where n' denotes a slot number corresponding to the effective time, W denotes an index of a last symbol of the first channel in an entire slot, $\mu_C$ and $\mu_S$ respectively denote configuration numbers corresponding to SCSs of the first channel and the second channel, $N_{symb}^{slot}$ denotes a quantity of consecutive symbols in a slot of a scheduling carrier, and X denotes the third minimum cross-slot scheduling interval of the scheduled carrier and may be a fixed value or a predefined value.

In another implementation, the third minimum cross-slot scheduling interval X of the scheduled carrier depends on a first minimum cross-slot scheduling interval k sent before the second minimum cross-slot scheduling interval k' is sent. In other words, the effective time depends on the following parameters: the position of the symbol where the first channel is located, the slot number n, the SCS of the scheduled carrier, the SCS of the scheduling carrier, and the first minimum cross-slot scheduling interval k.

The first minimum cross-slot scheduling interval k is greater than or equal to 0. For example, when a value of k is 0, that is, the first channel and the second channel are allowed to be sent in a same slot. In this case, a terminal is enabled with receiving of the second channel when receiving and decoding the first channel, which implements quick receiving of the second channel, but increases power consumption. When a value of k is greater than 0, that is, when the second channel is received in at least a next slot of the first channel, the terminal may not be enabled with receiving of the second channel when receiving and decoding the first channel, thereby implementing low power consumption.

The value of k may be pre-configured through RRC, or may be carried in DCI to be notified to the terminal. The value of k is carried in the DCI to be notified to the terminal, which can implement more free and flexible switching of an energy-saving mode.

In an implementation, the third minimum cross-slot scheduling interval X of the scheduled carrier is a larger one between the first minimum cross-slot scheduling interval k and a minimum feasible non-zero application delay Z of the SCS of the scheduled carrier, that is, X=max(Y, Z), where Y is the first minimum cross-slot scheduling interval k. In an implementation, Z may be 1, or may be a predefined number related to a subcarrier spacing. For example, Z is 1 when the subcarrier spacing is 15 kHz, 30 kHz, or 60 kHz, or is 2 when the subcarrier spacing is 120 kHz.

In an implementation, the first channel may include a physical downlink control channel (PDCCH), and the second channel may include a physical downlink shared channel (PDSCH) or a physical uplink shared channel (PUSCH).

In a case of cross-carrier scheduling, K may include K0 and K2. K0 denotes a cross-slot scheduling interval at which the PDSCH is scheduled by using the PDCCH, and K2 denotes a cross-slot scheduling interval at which the PUSCH is scheduled by using the PDCCH. Similarly, k may also include k0 and k2, and k' may also include k0' and k2', where k0 or k0' denotes a minimum cross-slot scheduling interval at which the PDSCH is scheduled by using the PDCCH, and k2 or k2' denotes a minimum cross-slot scheduling interval at which the PUSCH is scheduled by using the PDCCH. A method for determining an effective time of k0 or k0' and k2 or k2' is the same as that shown in FIG. 2A to FIG. 2C, and details are not described herein again.

Through application of the method for determining an effective time of a minimum cross-slot scheduling interval provided in this embodiment of the present disclosure to a network device, an effective time is determined and a second minimum cross-slot scheduling interval is made take effect on user equipment at or after the effective time, where the effective time depends on the following parameters: a location W of a symbol where a first channel is located, a slot number n, an SCS of a scheduled carrier, an SCS of a scheduling carrier, and a third minimum cross-slot scheduling interval X of the scheduled carrier, so that in a case of cross-carrier scheduling, an effective time recorded by the network device is consistent with an actual effective time of a changed minimum cross-slot scheduling interval on the user equipment, and an effective time of a changed value of k can be determined more properly. Therefore, a terminal can effectively implement cross-slot scheduling and terminal energy saving.

Figure 4:
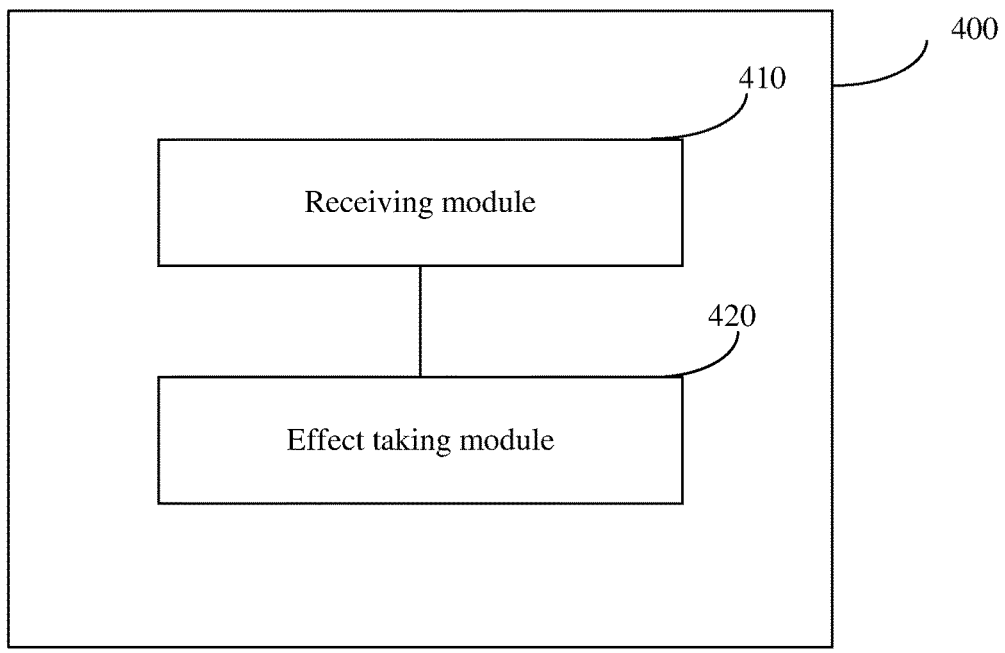
FIG. 4 is a schematic structural diagram of a mobile terminal according to an embodiment of the present disclosure.

FIG. 4 is a schematic structural diagram of a mobile terminal according to an embodiment of the present disclosure. The mobile terminal 400 includes a receiving module 410 and an effect taking module 420.

The receiving module 410 is configured to receive a second minimum cross-slot scheduling interval. The effect taking module 420 is configured to make the second minimum cross-slot scheduling interval take effect at or after an effective time, where the effective time depends on the following parameter: a position of a symbol where a first channel is located.

In a possible implementation, the effective time further depends on the following parameters: a slot number n, an SCS of a scheduled carrier, and an SCS of a scheduling carrier.

In a possible implementation, the effective time further depends on the following parameter: a third minimum cross-slot scheduling interval of the scheduled carrier.

In a possible implementation, the effective time further depends on the following parameters: a slot number n, an SCS of a scheduled carrier, and an SCS of a scheduling carrier, the effective time is a sum value obtained by adding up a second slot start position and a first slot interval and then performing rounding on an obtained result or by performing rounding on the second slot start position and the first slot interval and then adding up obtained results.

The second slot start position is a slot location that is of a scheduled carrier where the second channel is located, that corresponds to a first slot start position of a scheduling carrier where the first channel is located, and that is determined based on the slot number n, the SCS of the scheduled carrier, and the SCS of the scheduling carrier; and the first slot interval is a quantity of slots between a position of a last symbol of the first channel and the second slot start position.

In a possible implementation, the effective time further depends on the following parameter: a first minimum cross-slot scheduling interval received before the second minimum cross-slot scheduling interval is received; the effective time is a sum of the sum value and the third minimum cross-slot scheduling interval of the scheduled carrier.

In a possible implementation, the second slot start position is:

$$\left\lfloor n \cdot \frac{2^{\mu_S}}{2^{\mu_C}} \right\rfloor,$$

where $\mu_C$ and $\mu_S$ respectively denote configuration numbers corresponding to SCSs of the first channel and the second channel.

In a possible implementation, the first slot interval is:

$$\left\lfloor W \cdot \frac{2^{\mu_S}}{2^{\mu_C}} \middle/ N_{symb}^{slot} \right\rfloor \text{ or } \left\lceil W \cdot \frac{2^{\mu_S}}{2^{\mu_C}} \middle/ N_{symb}^{slot} \right\rceil,$$

where

W denotes an index of the last symbol of the first channel in an entire slot, $\mu_C$ and $\mu_S$ respectively denote configuration numbers corresponding to SCSs of the first channel and the second channel, and $N_{symb}^{slot}$ denotes a quantity of consecutive symbols in a slot of a scheduling carrier.

In a possible implementation, the effective time is a sum of the sum value and a third minimum cross-slot scheduling interval of the scheduled carrier, includes:

the effective time is:

$$n' = \left\lfloor n \cdot \frac{2^{\mu_S}}{2^{\mu_C}} \right\rfloor + \left\lfloor W \cdot \frac{2^{\mu_S}}{2^{\mu_C}} \middle/ N_{symb}^{slot} \right\rfloor + X; \text{ or}$$

$$n' = \left\lfloor n \cdot \frac{2^{\mu_S}}{2^{\mu_C}} \right\rfloor + \left\lceil W \cdot \frac{2^{\mu_S}}{2^{\mu_C}} \middle/ N_{symb}^{slot} \right\rceil + X; \text{ or}$$

$$n' = \left\lfloor n \cdot \frac{2^{\mu_S}}{2^{\mu_C}} + W \cdot \frac{2^{\mu_S}}{2^{\mu_C}} \middle/ N_{symb}^{slot} \right\rfloor + X,$$

where n' denotes a slot number corresponding to the effective time, W denotes an index of the last symbol of the first channel in an entire slot, $\mu_C$ and $\mu_S$ respectively denote configuration numbers corresponding to SCSs of the first channel and the second channel, $N_{symb}^{slot}$ denotes a quantity of consecutive symbols in a slot of a scheduling carrier, and X denotes the third minimum cross-slot scheduling interval of the scheduled carrier.

In a possible implementation, the third minimum cross-slot scheduling interval of the scheduled carrier depends on a first minimum cross-slot scheduling interval received before the second minimum cross-slot scheduling interval is received, and the first minimum cross-slot scheduling interval is greater than or equal to 0.

In a possible implementation, the third minimum cross-slot scheduling interval of the scheduled carrier is a larger one between the first minimum cross-slot scheduling interval and a minimum feasible non-zero application delay Z of the SCS of the scheduled carrier.

In a possible implementation, the first channel includes a PDCCH, and the second channel includes a PDSCH or a PUSCH.

The mobile terminal provided in this embodiment of the present disclosure can implement the processes and effects implemented by the mobile terminal in the method embodiment in FIG. 1. To avoid repetition, details are not described herein again.

Figure 5:
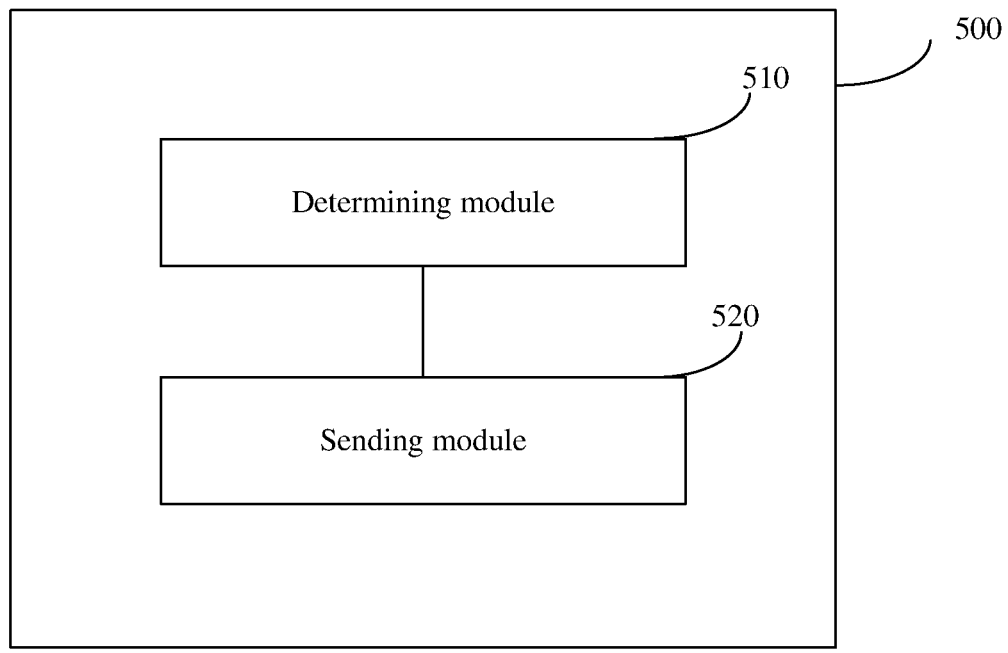
FIG. 5 is a schematic structural diagram of a network device according to an embodiment of the present disclosure.

FIG. 5 is a schematic structural diagram of a network device according to an embodiment of the present invention. The network device 500 includes a determining module 510 and a sending module 520.

The determining module 510 is configured to determine an effective time, where a second minimum cross-slot scheduling interval is made take effect on user equipment at or after the effective time, and the effective time depends on the following parameter: a position of a symbol where a first channel is located. The sending module 520 is configured to send the second minimum cross-slot scheduling interval.

In a possible implementation, the effective time further depends on the following parameters: a slot number n, an SCS of a scheduled carrier, and an SCS of a scheduling carrier.

In a possible implementation, the effective time further depends on the following parameter: a third minimum cross-slot scheduling interval of the scheduled carrier.

In a possible implementation, the effective time further depends on the following parameters: a slot number n, an SCS of a scheduled carrier, and an SCS of a scheduling carrier; the effective time is a sum value obtained by adding up a second slot start position and a first slot interval and then performing rounding on an obtained result or by performing rounding on the second slot start position and the first slot interval and then adding up obtained results.

The second slot start position is a slot location that is of a scheduled carrier where the second channel is located, that corresponds to a first slot start position of a scheduling carrier where the first channel is located, and that is determined based on the slot number n, the SCS of the scheduled carrier, and the SCS of the scheduling carrier; and the first slot interval is a quantity of slots between an end position of a last symbol of the first channel and the second slot start position.

In a possible implementation, the effective time further depends on the following parameter: a first minimum cross-slot scheduling interval sent before the second minimum cross-slot scheduling interval is sent; the effective time is a sum of the sum value and the third minimum cross-slot scheduling interval of the scheduled carrier.

In a possible implementation, the second slot start position is:

$$\left\lfloor n \cdot \frac{2^{\mu_S}}{2^{\mu_C}} \right\rfloor,$$

where $\mu_C$ and $\mu_S$ respectively denote configuration numbers corresponding to SCSs of the first channel and the second channel.

In a possible implementation, the first slot interval is:

$$\left\lfloor W \cdot \frac{2^{\mu_S}}{2^{\mu_C}} \Big/ N_{symb}^{slot} \right\rfloor \text{ or } \left\lceil W \cdot \frac{2^{\mu_S}}{2^{\mu_C}} \Big/ N_{symb}^{slot} \right\rceil,$$

where

W denotes an index of the last symbol of the first channel in an entire slot, $\mu_C$ and $\mu_S$ respectively denote configuration numbers corresponding to SCSs of the first channel and the second channel, and $N_{symb}^{slot}$ denotes a quantity of consecutive symbols in a slot of a scheduling carrier.

In a possible implementation, the effective time is a sum of the sum value and a third minimum cross-slot scheduling interval of the scheduled carrier, includes:

the effective time is:

$$n' = \left\lfloor n \cdot \frac{2^{\mu_S}}{2^{\mu_C}} \right\rfloor + \left\lfloor W \cdot \frac{2^{\mu_S}}{2^{\mu_C}} \Big/ N_{symb}^{slot} \right\rfloor + X; \text{ or}$$

$$n' = \left\lfloor n \cdot \frac{2^{\mu_S}}{2^{\mu_C}} \right\rfloor + \left\lceil W \cdot \frac{2^{\mu_S}}{2^{\mu_C}} \Big/ N_{symb}^{slot} \right\rceil + X; \text{ or}$$

$$n' = \left\lfloor n \cdot \frac{2^{\mu_S}}{2^{\mu_C}} + W \cdot \frac{2^{\mu_S}}{2^{\mu_C}} \Big/ N_{symb}^{slot} \right\rfloor + X,$$

where n' denotes a slot number corresponding to the effective time, W denotes an index of the last symbol of the first channel in an entire slot, $\mu_C$ and $\mu_S$ respectively denote configuration numbers corresponding to SCSs of the first channel and the second channel, $N_{symb}^{slot}$ denotes a quantity of consecutive symbols in a slot of a scheduling carrier, and X denotes the third minimum cross-slot scheduling interval of the scheduled carrier.

In a possible implementation, the third minimum cross-slot scheduling interval of the scheduled carrier depends on a first minimum cross-slot scheduling interval sent before the second minimum cross-slot scheduling interval is sent, and the first minimum cross-slot scheduling interval is greater than or equal to 0.

In a possible implementation, the third minimum cross-slot scheduling interval of the scheduled carrier is a larger one between the first minimum cross-slot scheduling interval and a minimum feasible non-zero application delay Z of the SCS of the scheduled carrier.

In a possible implementation, the first channel includes a PDCCH, and the second channel includes a PDSCH or a PUSCH.

Figure 6:
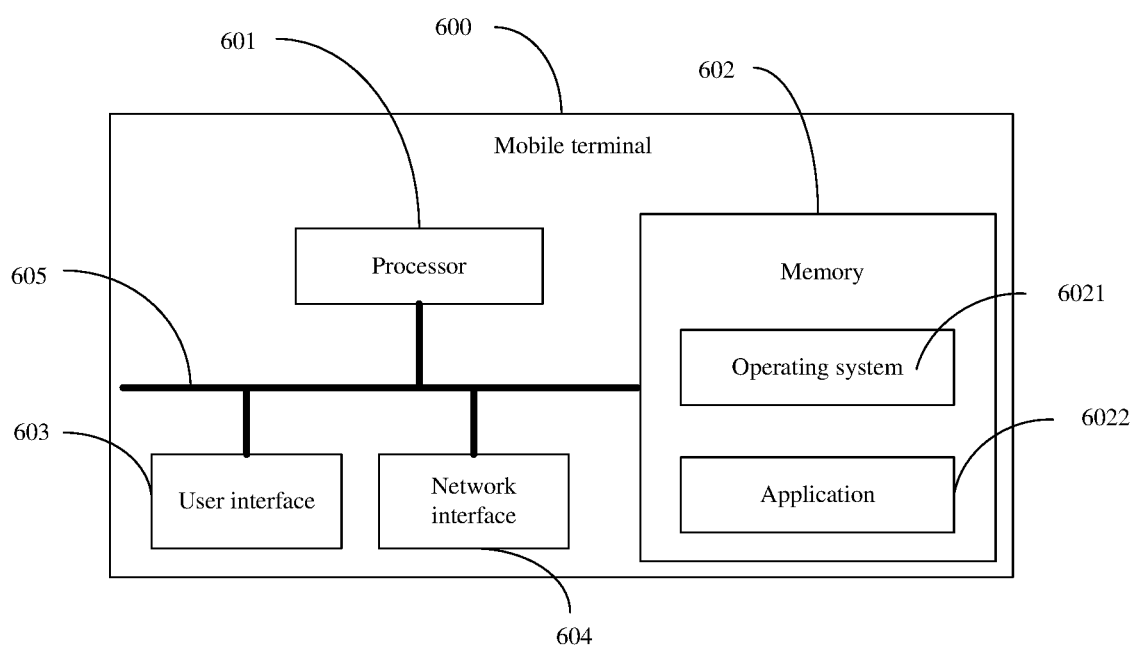
FIG. 6 is a block diagram of a mobile terminal according to another embodiment of the present disclosure.

FIG. 6 is a block diagram of a mobile terminal according to another embodiment of the present disclosure. As shown in FIG. 6, the mobile terminal 600 includes: at least one processor 601, a memory 602, at least one network interface 604, and a user interface 603. Various components of the mobile terminal 600 are coupled by using a bus system 605. It can be understood that the bus system 605 is configured to implement connection and communication between these components. In addition to a data bus, the bus system 605 may include a power bus, a control bus, and a status signal bus. However, for clarity of description, various buses are marked as the bus system 605 in FIG. 6.

The user interface 603 may include a display, a keyboard, or a clicking device (for example, a mouse, a trackball, a touch panel, or a touchscreen).

It may be understood that the memory 602 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 602 in the system and the method that are described in this embodiment of the present disclosure is to include but is not limited to these memories and a memory of any other proper type.

In some implementations, the memory 602 stores the following element: an executable module or a data structure, a subset thereof, or an extended set thereof: an operating system 6021 and an application program 6022.

The operating system 6021 includes various system programs, such as a framework layer, a kernel library layer, and a driver layer, and is used to implement various basic services and process hardware-based tasks. The application program 6022 includes various application programs, for example, a media player, a browser, and the like, and is configured to implement various application services. A program for implementing the method in the embodiments of the present disclosure may be included in the application 6022.

In this embodiment of the present disclosure, the mobile terminal 600 further includes: a computer program that is stored in a memory and executable on a processor, where when the computer program is executed by the processor, the following steps are implemented: receiving a second minimum cross-slot scheduling interval; making the second minimum cross-slot scheduling interval take effect at or after an effective time, where the effective time depends on the following parameter: a position of a symbol where a first channel is located.

The method disclosed in the embodiments of the present disclosure may be applied to the processor 601 or implemented by the processor 601. The processor 601 may be an integrated circuit chip having a signal processing capability. During implementation, the steps of the foregoing method can be completed by hardware integrated logic circuits in the processor 601 or instructions in the form of software. The foregoing processor 601 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 601 may implement or perform the methods, the steps, and logical block diagrams that are disclosed in the embodiments of the present disclosure. The general-purpose processor may be a microprocessor or may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 602, and the processor 601 reads information from the memory 602 and completes the steps of the foregoing method in combination with its hardware. Optionally, the non-transitory computer-readable storage medium stores a computer program, and when the computer program is executed by the processor 601, the steps of the foregoing method embodiment in FIG. 1 are implemented.

It may be understood that the embodiments described in the embodiments of the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

Optionally, when the computer program is executed by the processor 601, the following steps may be further performed:

In an implementation, the effective time further depends on the following parameters: a slot number n, an SCS of a scheduled carrier, and an SCS of a scheduling carrier.

In an implementation, the effective time further depends on the following parameter: a third minimum cross-slot scheduling interval of the scheduled carrier.

In a possible implementation, the effective time further depends on the following parameters: a slot number n, an SCS of a scheduled carrier, and an SCS of a scheduling carrier; the effective time is a sum value obtained by adding up a second slot start position and a first slot interval and then performing rounding on an obtained result or by performing rounding on the second slot start position and the first slot interval and then adding up obtained results, where the second slot start position is a slot location that is of a scheduled carrier where the second channel is located, that corresponds to a first slot start position of a scheduling carrier where the first channel is located, and that is determined based on the slot number n, the SCS of the scheduled carrier, and the SCS of the scheduling carrier; and the first slot interval is a quantity of slots between a position of a last symbol of the first channel and the second slot start position.

In an implementation, the effective time further depends on the following parameter: a first minimum cross-slot scheduling interval received before the second minimum cross-slot scheduling interval is received; the effective time is a sum of the sum value and the third minimum cross-slot scheduling interval of the scheduled carrier.

In an implementation, the second slot start position is:

$$\left\lfloor n \cdot \frac{2^{\mu_S}}{2^{\mu_C}} \right\rfloor,$$

where $\mu_C$ and $\mu_S$ respectively denote configuration numbers corresponding to SCSs of the first channel and the second channel.

In an implementation, the first slot interval is:

$$\left\lfloor W \cdot \frac{2^{\mu_S}}{2^{\mu_C}} \Big/ N_{symb}^{slot} \right\rfloor \text{ or } \left\lceil W \cdot \frac{2^{\mu_S}}{2^{\mu_C}} \Big/ N_{symb}^{slot} \right\rceil,$$

where

W denotes an index of the last symbol of the first channel in an entire slot, and $\mu_S$ respectively denote configuration numbers corresponding to SCSs of the first channel and the second channel, and $N_{symb}^{slot}$ denotes a quantity of consecutive symbols in a slot of a scheduling carrier.

In an implementation, the effective time is a sum of the sum value and a third minimum cross-slot scheduling interval of the scheduled carrier, includes:

the effective time is:

$$n' = \left\lfloor n \cdot \frac{2^{\mu_S}}{2^{\mu_C}} \right\rfloor + \left\lfloor W \cdot \frac{2^{\mu_S}}{2^{\mu_C}} \Big/ N_{symb}^{slot} \right\rfloor + X; \text{ or}$$

$$n' = \left\lfloor n \cdot \frac{2^{\mu_S}}{2^{\mu_C}} \right\rfloor + \left\lceil W \cdot \frac{2^{\mu_S}}{2^{\mu_C}} \Big/ N_{symb}^{slot} \right\rceil + X; \text{ or}$$

-continued $$n' = \left\lfloor n \cdot \frac{2^{\mu_S}}{2^{\mu_C}} + W \cdot \frac{2^{\mu_S}}{2^{\mu_C}} \bigg/ N_{symb}^{slot} \right\rfloor + X,$$

where n' denotes a slot number corresponding to the effective time, W denotes an index of the last symbol of the first channel in an entire slot, $\mu_C$ and $\mu_S$ respectively denote configuration numbers corresponding to SCSs of the first channel and the second channel, $N_{symb}^{slot}$ denotes a quantity of consecutive symbols in a slot of a scheduling carrier, and X denotes the third minimum cross-slot scheduling interval of the scheduled carrier.

In an implementation, the third minimum cross-slot scheduling interval of the scheduled carrier depends on a first minimum cross-slot scheduling interval received before the second minimum cross-slot scheduling interval is received, and the first minimum cross-slot scheduling interval is greater than or equal to 0.

In an implementation, the third minimum cross-slot scheduling interval of the scheduled carrier is a larger one between the first minimum cross-slot scheduling interval and a minimum feasible non-zero application delay Z of the SCS of the scheduled carrier.

In an implementation, the first channel includes a PDCCH, and the second channel includes a PDSCH or a PUSCH.

The mobile terminal 600 can implement each process and effect implemented by the mobile terminal in the foregoing embodiments. To avoid repetition, details are not described herein again.

Figure 7:
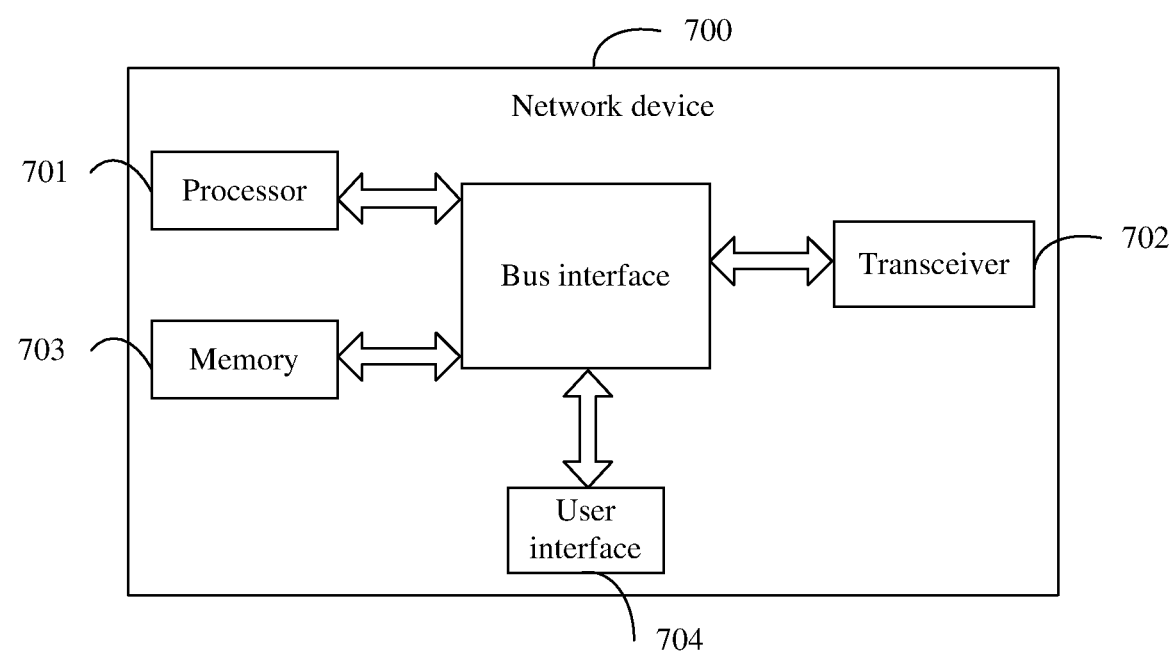
FIG. 7 is a structural diagram of a network device to which an embodiment of the present disclosure is applied.

Referring to FIG. 7, FIG. 7 is a structural diagram of a network device to which an embodiment of the present disclosure is applied, where the network device can implement details of the method in FIG. 3 and achieve a same effect. As shown in FIG. 7, the network device 700 includes: a processor 701, a transceiver 702, a memory 703, a user interface 704, and a bus interface.

In this embodiment of the present disclosure, the network device 700 further includes: a computer program that in stored in the memory 703 and executable on the processor 701, where when the computer program is executed by the processor 701, the following steps are implemented: determining an effective time, where a second minimum cross-slot scheduling interval is made take effect on user equipment at or after the effective time, and the effective time depends on the following parameter: a position of a symbol where a first channel is located; and sending the second minimum cross-slot scheduling interval.

In FIG. 7, the bus architecture may include any quantity of interconnected buses and bridges, which may be linked together by various circuits of one or more processors represented by the processor 701 and a memory represented by the memory 703. The bus architecture may further connect various other circuits such as peripheral devices, voltage regulators, and power management circuits, which are all known in the art, and therefore, no further description is given herein. The bus interface provides an interface. The transceiver 702 may be a plurality of elements, in other words, includes a transmitter and a receiver, and provides a unit configured to communicate with various other apparatuses on a transmission medium. For different user equipment, a user interface 704 may also be an interface capable of connecting externally and internally to a required device. The connected device includes but is not limited to a keypad, a display, a speaker, a microphone, a joystick, and the like.

The processor 701 is responsible for bus architecture management and general processing. The memory 703 may store data used by the processor 701 when the processor 701 performs an operation.

Optionally, the effective time further depends on the following parameters: a slot number n, an SCS of a scheduled carrier, and an SCS of a scheduling carrier.

Optionally, the effective time further depends on the following parameter: a third minimum cross-slot scheduling interval of the scheduled carrier.

Optionally, the effective time further depends on the following parameters: a slot number n, an SCS of a scheduled carrier, and an SCS of a scheduling carrier; the effective time is a sum value obtained by adding up a second slot start position and a first slot interval and then performing rounding on an obtained result or by performing rounding on the second slot start position and the first slot interval and then adding up obtained results.

The second slot start position is a slot location that is of a scheduled carrier where the second channel is located, that corresponds to a first slot start position of a scheduling carrier where the first channel is located, and that is determined based on the slot number n, the SCS of the scheduled carrier, and the SCS of the scheduling carrier; and the first slot interval is a quantity of slots between an end position of a last symbol of the first channel and the second slot start position.

Optionally, the effective time further depends on the following parameter: a first minimum cross-slot scheduling interval sent before the second minimum cross-slot scheduling interval is sent; the effective time is a sum of the sum value and the third minimum cross-slot scheduling interval of the scheduled carrier.

Optionally, the second slot start position is:

$$\left\lfloor n \cdot \frac{2^{\mu_S}}{2^{\mu_C}} \right\rfloor,$$

where $\mu_C$ and $\mu_S$ respectively denote configuration numbers corresponding to SCSs of the first channel and the second channel.

Optionally, the first slot interval is:

$$\left\lfloor W \cdot \frac{2^{\mu_S}}{2^{\mu_C}} \bigg/ N_{symb}^{slot} \right\rfloor \text{ or } \left\lceil W \cdot \frac{2^{\mu_S}}{2^{\mu_C}} \bigg/ N_{symb}^{slot} \right\rceil,$$

where

W denotes an index of the last symbol of the first channel in an entire slot, $\mu_C$ and $\mu_S$ respectively denote configuration numbers corresponding to SCSs of the first channel and the second channel, and $N_{symb}^{slot}$ denotes a quantity of consecutive symbols in a slot of a scheduling carrier.

Optionally, t the effective time is a sum of the sum value and the third minimum cross-slot scheduling interval of the scheduled carrier, includes:

the effective time is:

$$n' = \left\lfloor n \cdot \frac{2^{\mu_S}}{2^{\mu_C}} \right\rfloor + \left\lceil W \cdot \frac{2^{\mu_S}}{2^{\mu_C}} \bigg/ N_{symb}^{slot} \right\rceil + X; \text{ or}$$

-continued $$n' = \left\lfloor n \cdot \frac{2^{\mu_S}}{2^{\mu_C}} \right\rfloor + \left\lfloor W \cdot \frac{2^{\mu_S}}{2^{\mu_C}} \Big/ N_{symb}^{slot} \right\rfloor + X; \text{ or}$$

$$n' = \left\lfloor n \cdot \frac{2^{\mu_S}}{2^{\mu_C}} + W \cdot \frac{2^{\mu_S}}{2^{\mu_C}} \Big/ N_{symb}^{slot} \right\rfloor + X,$$

where n' denotes a slot number corresponding to the effective time, W denotes an index of the last symbol of the first channel in an entire slot, $\mu_C$ and $\mu_S$ respectively denote configuration numbers corresponding to SCSs of the first channel and the second channel, $N_{symb}^{slot}$ denotes a quantity of consecutive symbols in a slot of a scheduling carrier, and X denotes the third minimum cross-slot scheduling interval of the scheduled carrier.

Optionally, the third minimum cross-slot scheduling interval of the scheduled carrier depends on a first minimum cross-slot scheduling interval sent before the second minimum cross-slot scheduling interval is sent, and the first minimum cross-slot scheduling interval is greater than or equal to 0.

Optionally, the third minimum cross-slot scheduling interval of the scheduled carrier is a larger one between the first minimum cross-slot scheduling interval and a minimum feasible non-zero application delay Z of the SCS of the scheduled carrier.

Optionally, the first channel includes a PDCCH, and the second channel includes a PDSCH or a PUSCH.

An embodiment of the present disclosure further provides a non-transitory computer-readable storage medium. The non-transitory computer-readable storage medium stores a computer program, and when the computer program is executed by a processor, the processes in the method embodiment shown in FIG. 1 or FIG. 3 are implemented, and a same technical effect can be achieved. To avoid repetition, details are not described herein. The non-transitory computer-readable storage medium includes a read-only memory (ROM), a random access memory (RAM), a magnetic disk, an optical disc, or the like.

It should be noted that in this specification, the terms "comprise", "include" and any other variant thereof are intended to cover non-exclusive inclusion, so that a process, a method, an article, or an apparatus that includes a series of elements not only includes the elements, but may further include other elements not expressly listed, or further include elements inherent to this process, method, article, or apparatus. An element limited by "includes/comprises a . . . " does not, without more constraints, preclude the presence of additional identical elements in the process, method, article, or apparatus that includes the element.

Based on the descriptions of the foregoing implementations, a person skilled in the art can clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings. However, the present disclosure is not limited to the foregoing specific implementations. The foregoing specific implementations are merely exemplary, but are not limitative. Under the enlightenment of the present disclosure, a person of ordinary skill in the art may make many forms without departing from the objective and scope of the claims of the present disclosure, and all of which fall within the protection of the present disclosure.

What is claimed is:

1. A method for determining an effective time of a minimum cross-slot scheduling interval, applied to user equipment and comprising:
receiving a second minimum cross-slot scheduling interval; and
making the second minimum cross-slot scheduling interval take effect at or after an effective time, wherein the effective time depends on following parameters: a position of a symbol where a first channel is located and a subcarrier spacing (SCS) of a scheduling carrier.

2. The method according to claim 1, wherein the effective time further depends on following parameters: a slot number n and an SCS of a scheduled carrier.

3. The method according to claim 2, wherein the effective time further depends on following parameter: a third minimum cross-slot scheduling interval of the scheduled carrier.

4. The method according to claim 3, wherein the effective time further depends on following parameters: a slot number n, an SCS of a scheduled carrier, and an SCS of a scheduling carrier;
the effective time is a sum value obtained by adding up a second slot start position and a first slot interval and then performing rounding on an obtained result or by performing rounding on the second slot start position and the first slot interval and then adding up obtained results, wherein
the second slot start position is a slot location that is of a scheduled carrier where the second channel is located, that corresponds to a first slot start position of a scheduling carrier where the first channel is located, and that is determined based on the slot number n, the SCS of the scheduled carrier, and the SCS of the scheduling carrier; and the first slot interval is a quantity of slots between a position of a last symbol of the first channel and the second slot start position.

5. The method according to claim 4, wherein the effective time further depends on following parameter: a first minimum cross-slot scheduling interval received before the second minimum cross-slot scheduling interval is received;
the effective time is a sum of the sum value and a third minimum cross-slot scheduling interval of the scheduled carrier.

6. The method according to claim 4, wherein the second slot start position is:

$$\left\lfloor n \cdot \frac{2^{\mu_S}}{2^{\mu_C}} \right\rfloor,$$

wherein
$\mu_C$ and $\mu_S$ respectively denote configuration numbers corresponding to SCSs of the first channel and the second channel.

7. The method according to claim 4, wherein the first slot interval is:

$$\left\lfloor W \cdot \frac{2^{\mu_S}}{2^{\mu_C}} \middle/ N_{symb}^{slot} \right\rfloor \text{ or } \left\lceil W \cdot \frac{2^{\mu_S}}{2^{\mu_C}} \middle/ N_{symb}^{slot} \right\rceil,$$

wherein
W denotes an index of the last symbol of the first channel in a slot, μc and μs respectively denote configuration numbers corresponding to SCSs of the first channel and the second channel, and $N^{slot}_{sym\_b}$ denotes a quantity of consecutive symbols in a slot of a scheduling carrier.

8. The method according to claim 5, wherein the effective time is a sum of the sum value and a third minimum cross-slot scheduling interval of the scheduled carrier;
the effective time is:

$$n' = \left\lfloor n \cdot \frac{2^{\mu_S}}{2^{\mu_C}} \right\rfloor + \left\lfloor W \cdot \frac{2^{\mu_S}}{2^{\mu_C}} \middle/ N_{symb}^{slot} \right\rfloor + X; \text{ or}$$

$$n' = \left\lfloor n \cdot \frac{2^{\mu_S}}{2^{\mu_C}} \right\rfloor + \left\lceil W \cdot \frac{2^{\mu_S}}{2^{\mu_C}} \middle/ N_{symb}^{slot} \right\rceil + X; \text{ or}$$

$$n' = \left\lfloor n \cdot \frac{2^{\mu_S}}{2^{\mu_C}} + W \cdot \frac{2^{\mu_S}}{2^{\mu_C}} \middle/ N_{symb}^{slot} \right\rfloor + X,$$

wherein
n' denotes a slot number corresponding to the effective time, W denotes an index of the last symbol of the first channel in a slot, uc and us respectively denote configuration numbers corresponding to SCSs of the first channel and the second channel, $N^{slot}_{sym\_b}$ denotes a quantity of consecutive symbols in a slot of a scheduling carrier, and X denotes the third minimum cross-slot scheduling interval of the scheduled carrier.

9. The method according to claim 5, wherein the third minimum cross-slot scheduling interval of the scheduled carrier depends on the first minimum cross-slot scheduling interval received before the second minimum cross-slot scheduling interval is received, and the first minimum cross-slot scheduling interval is greater than or equal to 0.

10. The method according to claim 9, wherein the third minimum cross-slot scheduling interval of the scheduled carrier is a larger one between the first minimum cross-slot scheduling interval and a minimum feasible non-zero application delay Z of the SCS of the scheduled carrier.

11. The method according to claim 2, wherein the first channel comprises a physical downlink control channel (PDCCH), and the second channel comprises a physical downlink shared channel (PDSCH) or a physical uplink shared channel (PUSCH).

12. A method for determining an effective time of a minimum cross-slot scheduling interval, applied to a network device and comprising:
determining an effective time, wherein a second minimum cross-slot scheduling interval is made take effect on user equipment at or after the effective time, and the effective time depends on following parameters: a position of a symbol where a first channel is located and a subcarrier spacing (SCS) of a scheduling carrier; and
sending the second minimum cross-slot scheduling interval.

13. The method according to claim 12, wherein the effective time further depends on following parameters: a slot number n and an SCS of a scheduled carrier.

14. The method according to claim 13, wherein the effective time further depends on following parameter: a third minimum cross-slot scheduling interval of the scheduled carrier.

15. The method according to claim 14, wherein the effective time further depends on the following parameters: a slot number n, an SCS of a scheduled carrier, and an SCS of a scheduling carrier;
the effective time is a sum value obtained by adding up a second slot start position and a first slot interval and then performing rounding on an obtained result or by performing rounding on the second slot start position and the first slot interval and then adding up obtained results, wherein
the second slot start position is a slot location that is of a scheduled carrier where the second channel is located, that corresponds to a first slot start position of a scheduling carrier where the first channel is located, and that is determined based on the slot number n, the SCS of the scheduled carrier, and the SCS of the scheduling carrier; and the first slot interval is a quantity of slots between an end position of a last symbol of the first channel and the second slot start position.

16. The method according to claim 15, wherein the effective time further depends on the following parameter: a first minimum cross-slot scheduling interval sent before the second minimum cross-slot scheduling interval is sent;
the effective time is a sum of the sum value and a third minimum cross-slot scheduling interval of the scheduled carrier.

17. The method according to claim 13, wherein the first channel comprises a physical downlink control channel (PDCCH), and the second channel comprises a physical downlink shared channel (PDSCH) or a physical uplink shared channel (PUSCH).

18. A mobile terminal, comprising: a memory, a processor, and a computer program that is stored in the memory and executable on the processor, wherein the computer program, when executed by the processor, causes the mobile terminal to perform:
receiving a second minimum cross-slot scheduling interval; and
making the second minimum cross-slot scheduling interval take effect at or after an effective time, wherein the effective time depends on following parameters: a position of a symbol where a first channel is located and a subcarrier spacing (SCS) of a scheduling carrier.

19. The mobile terminal according to claim 18, wherein the effective time further depends on following parameters: a slot number n and an SCS of a scheduled carrier.

20. The mobile terminal according to claim 19, wherein the effective time further depends on following parameter: a third minimum cross-slot scheduling interval of the scheduled carrier.

* * * * *